United States Patent
Gedeon

(10) Patent No.: US 7,243,243 B2
(45) Date of Patent: Jul. 10, 2007

(54) APPARATUS AND METHOD FOR MEASURING AND CONTROLLING POWER CONSUMPTION OF A COMPUTER SYSTEM

(75) Inventor: Mazen G. Gedeon, Hillsboro, OR (US)

(73) Assignee: Intel Corporatio, Santa Clara, CA (US)

( * ) Notice: Subject to any disclaimer, the term of this patent is extended or adjusted under 35 U.S.C. 154(b) by 516 days.

(21) Appl. No.: 10/230,706

(22) Filed: Aug. 29, 2002

(65) Prior Publication Data

US 2004/0044914 A1 Mar. 4, 2004

(51) Int. Cl.
 *G06F 1/26* (2006.01)
(52) U.S. Cl. .................. 713/300; 713/340; 713/310; 713/320; 713/324; 713/301
(58) Field of Classification Search .............. 713/1, 713/2, 100, 300, 310, 320, 321, 323, 324, 713/330, 340, 375
See application file for complete search history.

(56) References Cited

U.S. PATENT DOCUMENTS

| | | | | |
|---|---|---|---|---|
| 5,630,144 A | * | 5/1997 | Woog et al. | 713/310 |
| 5,694,607 A | * | 12/1997 | Dunstan et al. | 713/340 |
| 5,996,084 A | | 11/1999 | Watts | |
| 6,137,277 A | * | 10/2000 | Rajda et al. | 323/301 |
| 6,148,408 A | * | 11/2000 | Shimoda | 713/320 |
| 6,313,984 B1 | | 11/2001 | Furay | 361/685 |
| 6,321,341 B1 | * | 11/2001 | Kamijo et al. | 713/340 |
| 6,367,023 B2 | * | 4/2002 | Kling et al. | 713/340 |
| 6,496,346 B1 | * | 12/2002 | Bruckner | 361/103 |
| 6,658,578 B1 | * | 12/2003 | Laurenti et al. | 713/324 |
| 2004/0003303 A1 | * | 1/2004 | Oehler et al. | 713/300 |

* cited by examiner

*Primary Examiner*—Thuan N. Du
*Assistant Examiner*—Fahmida Rahman
(74) *Attorney, Agent, or Firm*—Hanley, Flight & Zimmerman, LLC

(57) ABSTRACT

An apparatus and method for measuring and controlling power consumption of a computer system utilizing sensing circuitry. The sensing circuitry simultaneously senses the power consumption for each one of various components in the computer system, including the Central Processing Unit (CPU). The power consumption data is accumulated and sent to CPU in order to enable the CPU to control power of the various components of the computer system, including the CPU itself.

15 Claims, 4 Drawing Sheets

APPARATUS AND METHOD FOR MEASURING AND CONTROLLING POWER CONSUMPTION OF A COMPUTER SYSTEM

FIELD OF THE DISCLOSURE

The present disclosure relates to computer systems and, more particularly, to apparatus and method for determining and managing power consumption in a computer system.

BACKGROUND

With each new technology generation, the power consumption of computer central processing units (CPU's) increases. The increasing amount of power consumption with each new technology generation, however, increases demand for power from the computer power source. Increased power demand is particularly salient for mobile computers having a battery power source, such as laptop computers or Personal Data Assistants (PDA's) and for other computers running on a power source of limited capacity or duration. Thus, for these situations it is desirable to conserve energy to extend the amount of run time available on a single battery charge or to tailor computer energy consumption to a given limited power source.

Efforts to conserve energy and extend run time from the single battery charge, include programming the operating system (OS) of a CPU to turn off any peripheral devices that are idle or are presently not being used. Although this methodology may extend the total run time of a computer, users are given no indication of the remaining battery life. In order to provide some indication of how much run time a user can expect from a single battery charge, a battery run down test running various applications may be performed to give an expected run time estimate. Industry standard battery run down tests, such as the Ziff Davis Battery Mark, were developed to include performance of a mix of business, graphics and Internet applications during battery run down to arrive at a "typical usage figure" for the run time. Such figures, however, are somewhat inaccurate because the particular battery run down test may not include applications that are representative of a particular user, and processing loads inevitably vary from person to person.

Most notebook computers now include intelligent batteries that can keep track of their remaining capacity and provide an available run time based on a current consumption rate, which can be communicated to the OS of the CPU. Such information, however, is of little value to the computer user since the remaining capacity and available run time vary continually, depending on the amount of work being done by the CPU and peripheral devices. For example, a user may be given an indication that one hour of run time is available based on a current usage pattern (e.g., using a word processing application). If the user then decides to view a DVD or use a graphical application, however, the amount of remaining run time will decrease at a much higher rate. The one hour indication would then have been incorrect because other processing work loads have subsequently been added to the CPU and peripheral devices.

It is known that the power of a CPU is directly related to the product of the capacitance, frequency and square of the voltage of the CPU. Hence, a reduction in the frequency yields a direct power reduction, while a reduction in the voltage yields an exponential power reduction. Accordingly, efforts to conserve energy and increase run time have included programming the OS to decrease the clock frequency of the CPU and the voltage at which the CPU operates when being run by a battery, for example. An example of such programming is Intel's SpeedStep™ technology, which reduces the frequency and operating voltage of the processor power rail, as well as dimming the computer screen when the computer is operating on battery power. Typically programs such as SpeedStep™ perform a simple binary operation where a high-low signal (e.g., a Geyser high-low signal) asserts frequency and voltage reduction to predetermined values when operating on battery power and operation at full frequency and higher voltage when the computer is connected to an external power source. These programs, however, do not provide a user information concerning remaining run time or the ability to ensure that the remaining battery capacity is sufficient to meet a user's need to run a particular application for a given period of time.

DETAILED DESCRIPTION OF THE PREFERRED EXAMPLES

Figure 1:
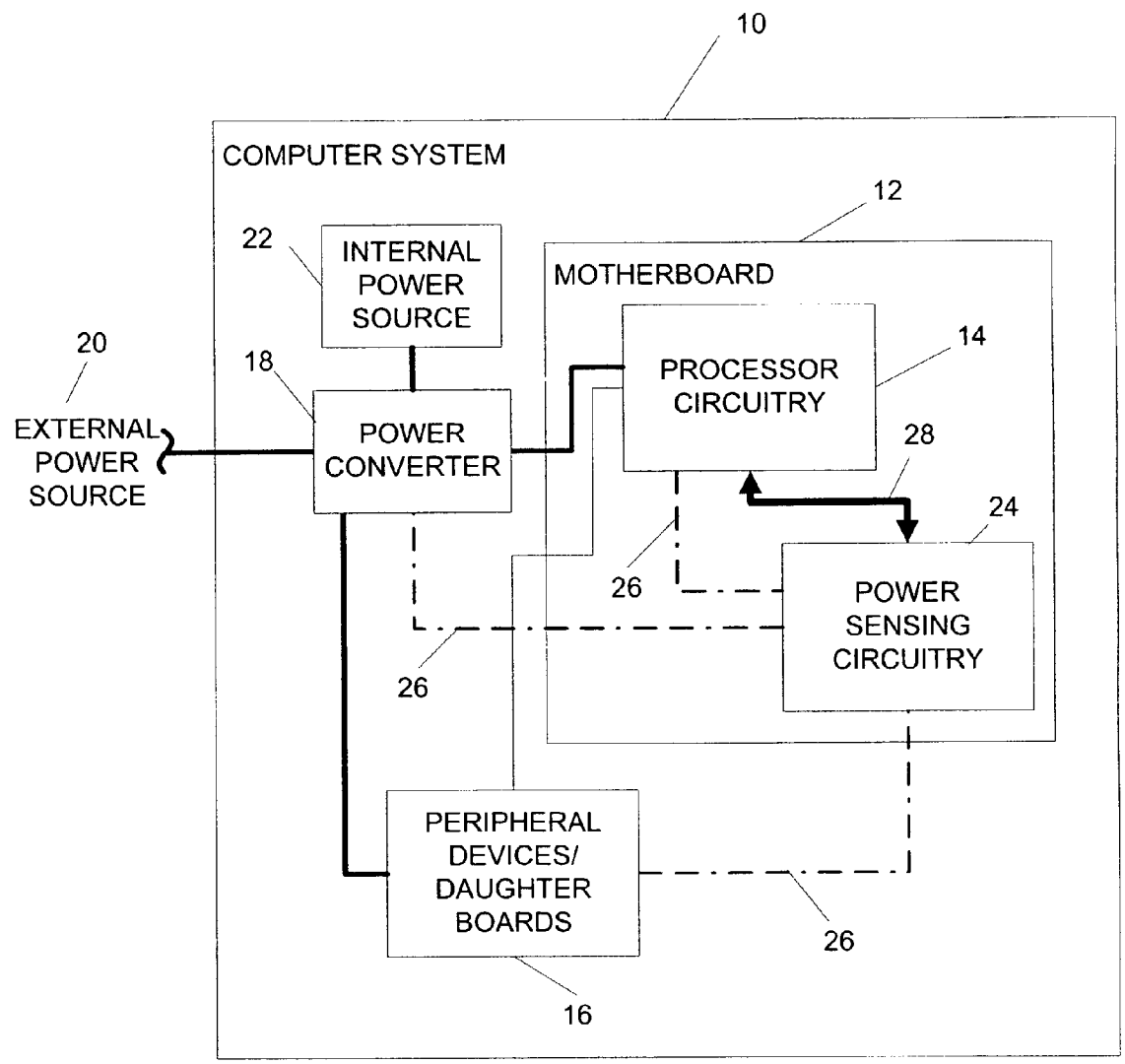
FIG. 1 illustrates a block diagram of an example computer system utilizing sensing circuitry for power monitoring and control.

FIG. 1 illustrates an example of a computer system 10 employing power sensing. Within the computer system 10 is a motherboard 12 that contains processor circuitry 14. The processor circuitry 14 includes, for example, a central processing unit (CPU), a voltage regulator for the CPU, system memory and associated memory controller, input/output control. The computer system 10 also includes peripheral devices and daughter boards 16 that may include, for example, additional system memory, video drivers, and graphics drivers.

Also within the computer system 10 is a power converter 18 that receives and conditions power from available power sources in order to power the processor circuitry 14 and the peripheral devices in daughter boards 16, as well as any other components within the computer system 10 requiring electrical power. The available power sources include an external power source 20 or, in the case of a mobile computer, also include an internal power source 22, such as a battery.

For the purpose of sensing power consumption of the various devices in the computer system 10, a power sensing circuit 24 is included. This power sensing circuit 24 may be included within the motherboard 12, as shown in FIG. 1, separate from the motherboard 12, incorporated within the processor circuitry 14 or incorporated within the CPU. The power sensing circuitry 24 accomplishes sensing via power sensors (not shown in FIG. 1) and accompanying communication connections 26 from the various components such as the processor circuitry 14, the peripheral devices/daughter boards 16 and the power converter 18 (i.e., for sensing the total power input to the computer system 10). As the power sensing circuitry 24 senses the power consumption of the various devices, the circuitry 24 communicates the sensed power consumption to the processor circuitry 14 via a communication connection 28. Once power consumption is communicated to the processor circuitry 14 and, in particular, the CPU, power characteristics of the computer system 10 can be controlled based on the known power consumption.

The illustrated computer system 10 may optionally comprise a laptop computer or other mobile computing devices such as Personal Data Assistants (PDA's). Additionally, the computer system 10 may optionally be a personal computer or even a server. In these latter applications, the personal computer or server may simply monitor more closely their own power consumption than was available in the prior solutions. This information can be particularly helpful where the personal computer or server is operating from a limited source of power, such as a battery back-up system or emergency generator, to control their power consumption in order to ensure that the power consumption is minimized.

Figure 2:
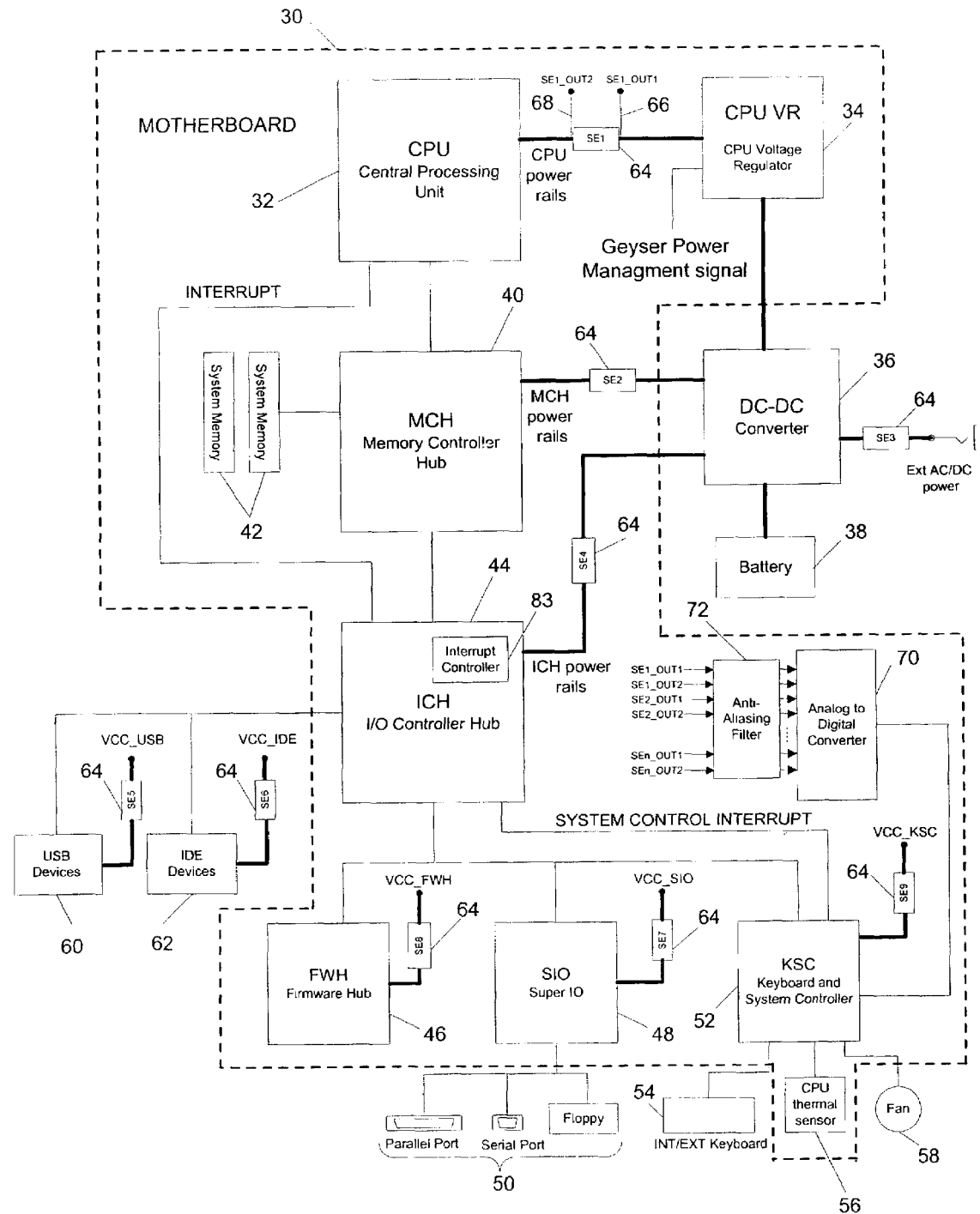
FIG. 2 illustrates a detailed block diagram of an example computer system motherboard employing power sensing and control.

FIG. 2 illustrates another example computer system employing a power sensing circuit that utilizes, in part, known components of typical computer motherboards to perform power sensing and control of the power consumption. As shown, a motherboard 30 includes a central processing unit (CPU) 32 that is powered by a CPU voltage regulator 34, which regulates the voltage delivered to the CPU 32 over the CPU power rails. The CPU voltage regulator 34, in turn, receives power from a DC-DC power converter 36. The DC-DC converter 36 receives power from either an external AC to DC power converter or from a battery 38 in the case of a mobile device.

In the illustrated example, the motherboard 30 also includes a memory controller hub (MCH) 40, which controls access to system memories 42. The converter 36 also powers an input/output (I/O) controller hub (ICH) 44. In this example, the I/O controller hub 44 controls input and output access to the CPU 32 from various devices. These devices include a firmware hub (FWH) 46 that contains, for example, a system BIOS and integrated graphics/video BIOS. Also connected to the illustrated I/O controller hub 44 is a Super I/O 48 that controls input and output to various I/O ports and devices such as a parallel port, serial port and floppy disk drive, these being collectively labeled with reference number 50 in FIG. 2.

The illustrated motherboard 30 also includes a keyboard and system controller (KSC) 52. The KSC 52 performs numerous control functions. One function is interfacing with a keyboard, either external or internal (in the case of a laptop computer). Additionally, the CPU 32 typically contains a thermal sensor 56 (which, despite the location shown in FIG. 2, is actually located within the integrated circuit package) for the purpose of monitoring the temperature of the CPU. Another function of the KSC 52 is to monitor this thermal sensor 56. The KSC 52 also controls operation of a cooling fan 58, such as, in response to detection of a threshold temperature occurring in the CPU.

Other devices connected to the I/O controller hub 44 include Universal Serial Bus (USB) devices 60 and Integrated Device Electronics (IDE) devices 62, such as a hard disk.

For the purpose of monitoring the power consumption of the various components in the computer system, the example of FIG. 2 utilizes the keyboard and system controller (KSC) 52 as a co-processor to monitor the power consumption of the CPU 32 as well as other various components on the motherboard 30 or in the computer system, which includes the keyboard and system controller 52 itself. By utilizing the KSC 52 as a co-processor, the CPU 32 does not have to expend any processing time or capacity for the purpose of monitoring power consumption. It is noted, however, that a processor for monitoring power consumption could also be a stand-alone processor mounted either on the motherboard 30 or external to the motherboard 30. Additionally, the processing for monitoring power consumption also could be located within the integrated circuit package housing the central processing unit (CPU) 32.

In order to sense power consumption, a number of power sensors are located in the power feeds to the various components. In the example of FIG. 2, these sensors 64 are labeled consecutively SE1 through SEn where "n" represents the total number of sensors utilized. These sensors may be a small resistor, such as a ten milliohm (10 mΩ) resistor, placed in series with a power feed for determining current present in that power feed. Other devices such as a Hall-effect sensor or a toroidal current loop may alternatively be used to measure current. An advantage, however, of utilizing a series connected resistance is compensation for noise present in the power feeds, as will be discussed later.

When utilizing sensors 64 comprising series connected resistors, the current through the resistor and, hence, present on the device power feed, is determined by Ohm's law. By measuring the voltage drop across the sensor 64, which has a known resistance, the current is computed by dividing the voltage by the resistance. For the purpose of illustration, the sensor 64 connected in series with the power rails to the CPU 32 is shown illustrated with voltage taps 66, 68 that are respectively taken off the sides of the sensor 64 for the purpose of determining the differential voltage present between the two sides of the sensor 64. These taps 66, 68 labeled respectively as SE1_OUT1 and SE1_OUT2 deliver the voltages present on both sides of the sensor 64 to an analog-to-digital (A/D) converter 70. Likewise, the other sensors 64 include similar taps that are used to deliver the voltages present on both sides of the sensors 64 (in the case of resistors being used as the sensors 64) to the A/D converter 70. The A/D converter 70, in turn, converts the analog signals from the sensors 64 to digital signals that are usable by the logic of the keyboard and system controller (KSC) 52. Similarly, the other sensors 64 deliver corresponding voltages to the analog to digital converter 70.

As mentioned previously, the use of resistors for the sensors 64 is advantageous for noise compensation. Specifically, the noise present on one side of the resistance will be present on the other side of the resistance. Because the voltage due to noise is present on both sides of the resistor 64, when the differential voltage is computed (i.e., a difference between the voltages on the two sides of the resistance is found) noise immunity is afforded because the voltage due to noise is cancelled by the subtraction operation. Thus, by sensing the differential voltage, it is possible to obtain an accurate measurement of the actual current traveling in the power feed.

The illustrated A/D converter 70 includes a plurality of channels to receive the voltage inputs from the sensors 64. Since two voltages are read from each of the sensors 64 (i.e., in the case of resistor sensors), each sensor 64 requires two channels of the A/D converter 70. Once the analog signals have been converted to digital signals they are output by the A/D converter 70 to the keyboard and system controller (KSC) 52 (or to whatever controller is performing power consumption monitoring). Additionally, the illustrated A/D converter 70 has an associated anti-aliasing filter 72 that filters out peaks and spikes in the power consumption that may occur with momentary loads and cause inaccurate sensing of the average power consumed by the devices monitored.

Another feature of the illustrated A/D converter 70 is that it simultaneously converts the present voltages input to digital signals. This feature allows the controller to receive a "snapshot" of the power consumption of all the devices occurring at a given moment in time. Additionally, the illustrated A/D converter 70 is configured to convert the incoming analog voltage signals to digital signals at periodic times according to a predetermined sampling rate, such as once every millisecond, ten milliseconds or 100 milliseconds, as examples.

The illustrated A/D converter 70 may either transmit to the controller 52 the two voltage values from each sensor 64 or, alternatively, may compute the differential voltage for each sensor 64 and also compute the current using Ohm's law, as discussed previously. In this latter case, the A/D converter 70 simply outputs a voltage (i.e., a voltage present on the power feed, which is used for power calculation, as will be discussed below) and current to the keyboard and system controller (KSC) 52. The A/D converter 70 computes the voltage and current by hardware, firmware or software.

Irrespective of whether the A/D converter 70 or the KSC 52 compute the differential voltage and the current sensed by each sensor 64, the illustrated KSC 52 will compute the power by calculating the product of the input voltage present on a power feed and the current within the sensor. It is noted that the input voltage present is taken from one of the sensor voltage taps, preferably the "downstream" side (i.e., the output having the lower voltage due to voltage drop in the sensor resistance, such as SE1_OUT2 68, for example). For example, to compute the power for the CPU 32, the current is multiplied by the voltage present on output SE1_OUT1 68 to compute the power consumption of the CPU 32. By utilizing the voltage present on the "downstream" side of the sensor for the power computation, the power consumption of the sensor 64 is not taken into account when determining the power consumption of a device, which more accurately reflects only the power consumption of the device and does not include the power dissipation of the sensor 64.

Figure 3:
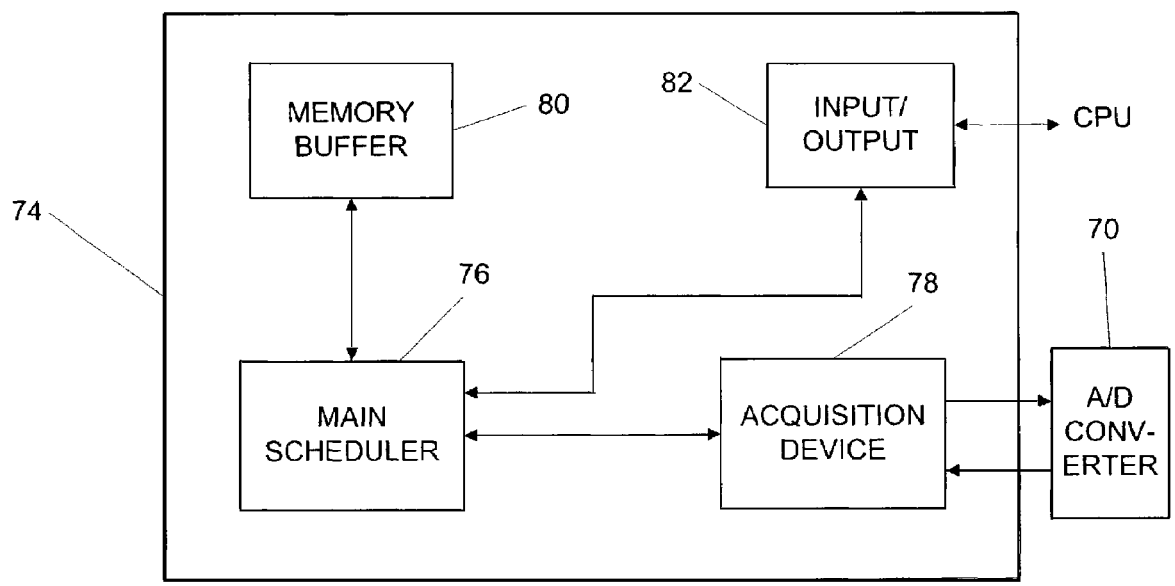
FIG. 3 illustrates a block diagram of an example firmware controller for use in monitoring and controlling power consumption in an example computer system.

Within the keyboard and system controller 52, the apparatus for measuring the power consumption may be implemented by hardware, software or firmware. A block diagram illustrating an example firmware implementation is shown in FIG. 3. As shown, a power sensing apparatus 74 includes a main scheduler 76 that directs the power measurement operation. Within the main scheduler 76 is a clock for establishing and/or maintaining the sampling frequency. This frequency may be predetermined and stored in the main scheduler 76 or may be modifiable by input from the CPU 32. The main scheduler 76 also serves to perform processing operations, such as computing the current in the sensors 64 (if not performed by the analog to digital converter 70) and the power for each corresponding device.

The illustrated power sensing apparatus 74 also includes an acquisition device 78 that receives the digital voltage and/or current values sent by the analog to digital converter. Additionally, the illustrated main scheduler 76 periodically signals the analog-to-digital (A/D) converter 70 via the acquisition device 78 according to the sampling frequency to read and output the present voltages and currents of all the sensors 64 simultaneously. The A/D converter 70 responds to this signal by sending digital signals to the acquisition device 78, which, in turn, relays the measured values to the main scheduler 76.

The illustrated power measuring apparatus 74 also includes a memory buffer 80 that is preferably a circular memory for storing present power consumption values. The illustrated power sensing apparatus 74 also includes an input/output 82 that allows communication between the main scheduler 76 and the CPU 32 for receiving commands input from the CPU 32 and for outputting the power consumption data to the CPU, as examples. Another function of the input/output 82 is also to signal a system control interrupt to the CPU 32 via an interrupt controller 83 located within the I/O controller hub 44 (shown in FIG. 2). The interrupt controller 83 then signals an interrupt to the CPU 32 as illustrated by the interrupt connection between the I/O controller hub 44 and the CPU 32.

Figure 4:
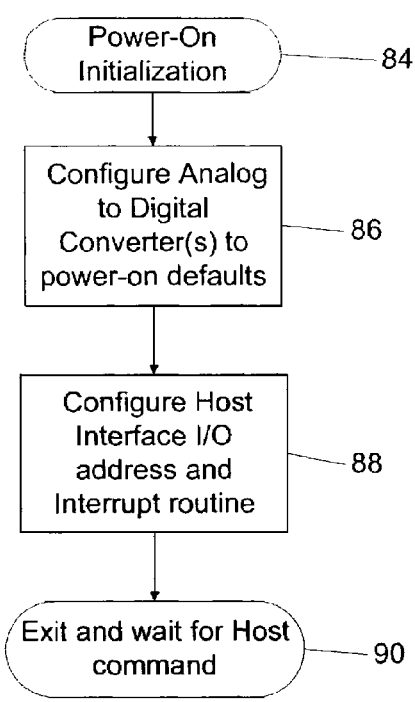
FIG. 4 is a flow chart of an example initialization sequence for use and power monitoring and control.
Figure 6:
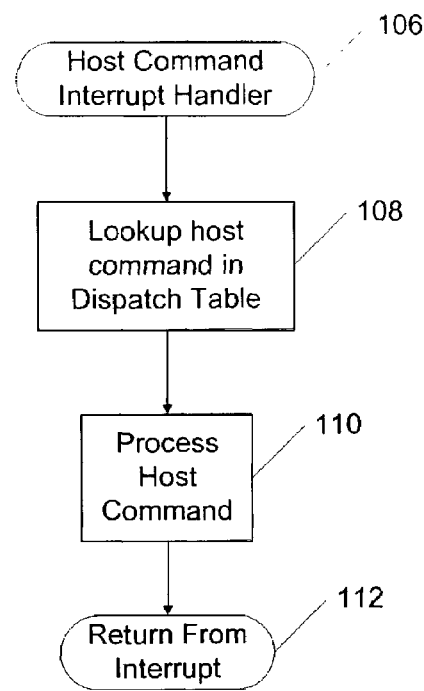
FIG. 6 is a flow diagram illustrating an example interrupt process performed for control of power consumption in an example computer system.
Figure 5:
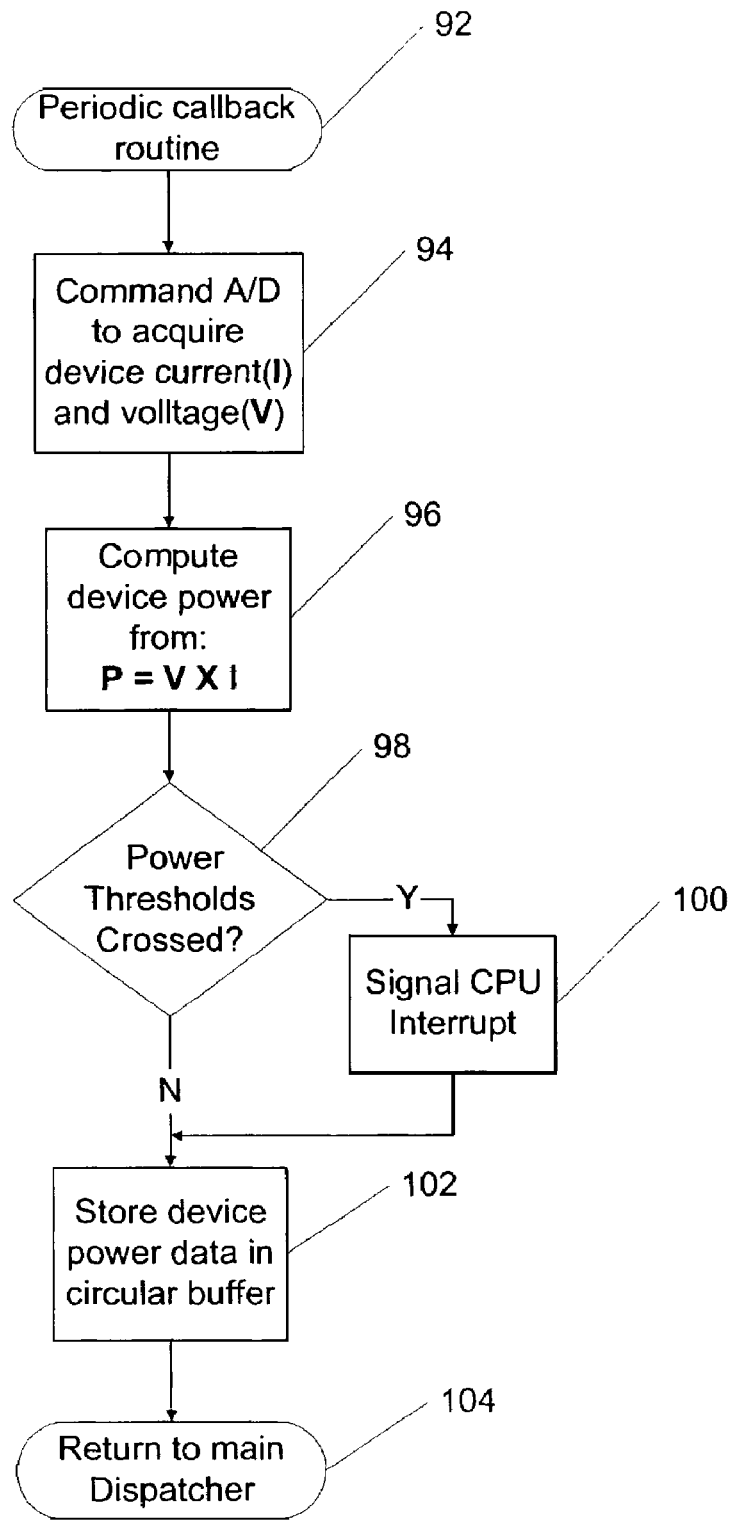
FIG. 5 is a flow chart of an example process for determining power consumption in an example computer system.

An example process for acquiring power consumption data is illustrated in FIGS. 4-6 and discussed below.

FIG. 4 illustrates an example initialization process performed by the keyboard and system controller (KSC) 52 (or whichever controller is utilized for power consumption measurement). As shown the power-on initialization process for the A/D converter 70 is first initiated (block 84). Upon initiation of the process, the A/D converter 70 is configured to a power-on default (block 86). That is, the illustrated A/D converter 70 has a power-on default sampling rate that is initialized as indicated in block 86. The illustrated main scheduler 76 effects this initialization, as shown in FIG. 3, via the acquisition device 78 or by some other means for communicating between the controller performing power monitoring (e.g., KSC 52) and the A/D converter 70.

Next, the controller configures a host interface input/output address and interrupt routine (block 88). Here communication between the controller (e.g., KSC 52) and the CPU 32 is established. An apparatus for effecting this communication is illustrated in FIG. 2, which shows a system control interrupt line between the keyboard and system controller 52 and the I/O controller hub 44 as well as the interrupt controller 83 within the I/O controller hub 44 and the interrupt line between the controller hub 44 and the CPU 32.

An example interrupt routine is initiated at block 88. An interrupt is typically a number or address that allows the controller (e.g., KSC 52) to alert the CPU 32 that a predetermined condition has occurred. In this example the predetermined condition is whether or not one or more power thresholds are exceeded. Accordingly, when the power threshold is exceeded the CPU 32 is interrupted in order to process further information and/or initiate a power conservation routine, for example, within its operating system. Upon initialization of the interrupt routine, the controller (e.g., KSC 52) exits the initialization process (block 90). Once initialized, the controller 52 is armed and ready to acquire power consumption data and trigger the A/D converter 70, for example, to acquire power consumption data.

Once the power consumption measuring process is ready to acquire data, the illustrated controller 52 initiates a call back routine for every sampling period based on a predetermined sampling rate. FIG. 5 illustrates this periodic call back routine, which is first initialized (block 92). After initialization, the main scheduler sends a command via the acquisition device 78 to the A/D converter 70 to acquire device currents and voltages from the different sensors 64 (block 94). As discussed previously, the A/D converter simultaneously acquires these currents and voltages for all of the sensors 64 in order to provide an accurate "snapshot"

of the aggregate power consumption occurring in the computer system at a particular point in time. Next, either the A/D converter 70 or the main scheduler 76 compute the respective device power consumptions for each of the components being sensed, preferably from the power equation taking the product of the voltage and current (block 96).

Once the main scheduler 76 computes the various power consumptions, the main scheduler 76 determines whether any of a number of predetermined power thresholds have been crossed or exceeded (block 98). These predetermined power thresholds may be used to set a minimal level at which interruption of the CPU 32 is warranted for purposes of power conservation. Nonetheless, if real time power monitoring is desired to be delivered to the CPU 32, there is typically no need to use power thresholds. However, real time monitoring requires heavier utilization of CPU processing, thereby diverting processing capacity from other CPU activities.

If one or more power thresholds have been crossed (block 98), the controller (e.g., KSC 52) sends a CPU interrupt signal as indicated at block 100. The main scheduler 76 via the input/output unit 82 may send this signal. The controller 52 interrupts the CPU 32 so that it will perform a power management task or routine upon receipt of this interrupt signal, as will be discussed further with respect to FIG. 6. After the signal interrupt is sent, power data of the different components being monitored is stored in a circular memory buffer. This corresponds to memory buffer 80 as illustrated in FIG. 3 (block 102). This memory buffer is a circular buffer of arbitrary length (i.e., storage capacity), as an example. The length is dependent on the memory available and how much data is required to be stored. Because the memory buffer 80 is a circular buffer, some of the data potentially can be flushed with each sampling period or every few sampling periods dependent on the particular length of the buffer. The flushed data, however, may be stored longer term to another memory (not shown) that accumulates power consumption data such as for profiling power consumption of particular software being run by the computer system or other applications. Alternatively, if no power thresholds have been exceeded (block 98), the process flow proceeds directly to block 102.

Once the power data is stored (block 102), the process returns to a main dispatcher process (block 104). In this example, the dispatcher process is run within the main scheduler 76 of the power consumption logic 74, or, alternatively, by other logic within the controller (e.g., KSC 52).

As mentioned previously, the process illustrated in FIG. 6 is initiated when an interrupt signal is sent by the controller 54 to the CPU 32. Here the CPU 32 receives an interrupt signal (block 106). For example, the interrupt is initiated when a power threshold has been exceeded as illustrated in blocks 98 and 100 of FIG. 5. Once the CPU 32 receives an interrupt signal (block 106), the CPU looks up the host command received from the processor 54 in its interrupt dispatch table (block 108). The CPU next processes the host command (block 110). For example, the CPU 32, based on the command and the dispatch table, may limit performance by throttling its clock or throttling any other component in the computer system. After the CPU 32 processes the host command (block 110), the CPU 32 returns from the interrupt state to resume operations occurring prior to the interrupt (block 112).

Additionally, when the CPU 32 processes a command (block 110), the CPU 34 may perform operations such as computing a desired run time and a corresponding power threshold amount that will ensure the desired run time as long as the system is limited to that computed power. Thus, the CPU 32 may vary the threshold amount within the controller 52. Moreover, the operating system of the CPU 32 may run a power conservation routine that is configured to also modify the power usage of the illustrated CPU 32 itself, such as through a SpeedStep™ transition or another predetermined routine that controls power consumption, such as through control of the computer operating frequency and rail voltage. The CPU 32 may also (additionally or alternatively) modify the power usage of other components on the motherboard 30 or in the computer system 10 by limiting their operation or shutting them down all together.

Other examples of power conservation and management functions performed by the CPU 32 include the ability to receive an input desired run time and/or performance level entered by a user. The power management functionality then controls and manages power consumption of the CPU 32 as well as other components in the computer system to ensure the desired run time and performance. This management is facilitated by sensing the power consumption of the components as well as power consumption of the CPU 32 occurring during execution of particular processing tasks. Additionally, this function may retrieve watt/hour information from the battery, in the case of a portable device, in order to adaptively tailor the performance characteristics of applications currently running to the remaining energy of the battery.

Using the illustrated power monitoring system where a CPU is self-aware of its power consumption may also allow improved software development, since the CPU can monitor the power consumption when given processing task (e.g., software applications) are running. Thus, software developers, for example, can use the power consumption information to write code that is more power efficient, such as by optimizing long loops or reducing the frequency of certain operations in order to reduce the processing demands imposed by the software on the CPU.

From the foregoing, persons of ordinary skill in the art will appreciate that, given concerns of conserving energy and extending computer run times, especially for mobile computers, methods and apparatus for accurately sensing and controlling power consumption of a central processing unit (CPU), as well as peripheral devices have been disclosed. In the illustrated examples, the CPU is self-aware of its own power consumption as well as the current power consumption of other components on the motherboard, peripheral devices, and also the total power consumption of the computer system. Such information can, in turn, be used by the CPU to predict total run time of a mobile computer or ensure a guaranteed run time from a particular battery charge, for example. Additionally, in the illustrated examples the CPU may obtain statistics on its own power usage when different software applications are running, which allows the CPU to more accurately determine a predicted run time based on which particular applications are presently running.

Although certain apparatus constructed in accordance with the teachings of the invention have been described herein, the scope of coverage of this patent is not limited thereto. On the contrary, this patent covers all embodiments of the teachings of the invention fairly falling within the scope of the appended claims, either literally or under the doctrine of equivalents.

What is claimed is:

1. An apparatus for determining power characteristics of a plurality of components within a computer system, the apparatus comprising:

a processor to receive a user defined value representative of a desired length of time to run on battery power;

a plurality of sensors, where each sensor is configured to sense at least one of voltage or current of a corresponding component of the plurality of components, at least one of the plurality of sensors to sense at least one of the voltage or current of the processor;

an analog-to-digital converter in communication with the plurality of sensors and configured to substantially simultaneously receive the voltages or currents sensed by the plurality of sensors and to convert the voltages or currents into digital signals to create a snapshot of current power usage by the components and current power usage by the processor at a substantially instantaneous point in time; and a keyboard and system controller in communication with the analog-to-digital converter to receive the digital signals, and determine power consumption characteristics for one or more of the plurality of components and the processor based on the received digital signals at the substantially instantaneous point in time, the keyboard and system controller providing the power consumption characteristics to the processor only when a condition is met, the processor to adaptively control operation of at least one of the components and the processor based on the power consumption characteristics received from the keyboard and system controller to ensure the battery power lasts for the desired length of time defined by the user.

2. The apparatus as defined in claim 1, wherein each of the plurality of sensors is in circuit with a respective power feed connection of corresponding ones of the plurality of components.

3. The apparatus as defined in claim 1, wherein the keyboard and system controller comprises one of the plurality of components.

4. An apparatus for managing power within a computer system comprising:

a central processing unit to receive a user defined value representative of a desired length of time to run on battery power;

a data acquisition circuit configured to acquire at least one of current or voltage for one or more devices within the computer system;

a conversion circuit configured to substantially simultaneously convert the acquired currents or voltages to corresponding digital values to create a snapshot of current power usane by the devices at a substantially instantaneous point in time;

a keyboard and system processing circuit configured to compute power consumption data from the digital values for each of the one or more devices, to determine when the computed power consumption data exceeds a threshold power value and to pass the computed power consumption data to central processing unit only when the threshold value is exceeded; and a memory buffer configured to store the computed power consumption data, wherein the central processing unit is structured to adaptively control operation of at least one of the devices based on the power consumption data received from the keyboard and system controller to ensure the battery power lasts for the desired length of time defined by the user.

5. The apparatus as defined in claim 4, wherein the data acquisition circuit is configured to acquire voltage and current data according to a prescribed periodic sampling rate.

6. The apparatus as defined in claim 5, wherein the memory buffer comprises a circular buffer that is configured to store power consumption data during each current sampling period.

7. An apparatus comprising:

a processor circuit to receive a user defined value representative of a desired length of time to run on battery power;

a peripheral component;

sensors to sense power consumption of the processor circuit and the peripheral component; and a keyboard and system controller in circuit with the sensors to determine if sensed power consumption data based on the power consumption sensed by the sensors indicates that a threshold sufficient to justify an interrupt to the processor circuit has been met, and, if the threshold has been met, to communicate the power consumption data to the processor circuit, the processor circuit to calculate an expected runtime based on the power consumption data and to adaptively control a power consumption characteristic of the processor circuit and the peripheral component to ensure the expected run time at least equals or exceeds the desired length of time defined by the user.

8. The apparatus as defined in claim 7, wherein the apparatus comprises at least one of a laptop computer, a PDA, a personal computer or a server.

9. The apparatus as defined in claim 7, wherein the processor circuit comprises a central processing unit.

10. The apparatus as defined in claim 7, wherein the processor circuit comprises a motherboard including a central processing unit and the keyboard and system controller.

11. The apparatus as defined in claim 7, wherein the sensors are in circuit with one or more power feeds of the processor circuit for sensing at least one of current or voltage values in each of the power feeds; and further comprising:

an analog to digital converter for receiving the sensed current or voltage and converting the received current and voltage values into digital signals; wherein the keyboard and system controller is to receive the digital signals, and determine the power consumption data based on the received signals.

12. The apparatus as defined in claim 11, wherein the analog to digital converter is configured to substantially simultaneously sample the sensed current or voltage values at a predetermined sampling rate.

13. The apparatus as defined in claim 11, wherein the keyboard and system controller is configured to receive both digital signals representing current and voltage in the one or more power feeds and to compute power in the one or more power feeds by computing the product of the current and voltage.

14. The apparatus as defined in claim 7, wherein the processor circuit comprises a central processing unit that includes an associated operating system running a computer power usage routine.

15. The apparatus as defined in claim 14, wherein the power usage routine is configured to modify power usage of the central processing unit and the peripheral component.

* * * * *

UNITED STATES PATENT AND TRADEMARK OFFICE
CERTIFICATE OF CORRECTION

PATENT NO. : 7,243,243 B2 Page 1 of 1
APPLICATION NO. : 10/230706
DATED : July 10, 2007
INVENTOR(S) : Mazen G. Gedeon It is certified that error appears in the above-identified patent and that said Letters Patent is hereby corrected as shown below:

Cover page of Patent after "Assignee: Intel" remove "Corporatic" and insert --Corporation--.

Col. 9, line 48 after "power" remove "usane" and insert --usage--.

Col. 9, line 55 after "data to" insert --the--.

Signed and Sealed this

Fourth Day of September, 2007

JON W. DUDAS
*Director of the United States Patent and Trademark Office*